(12) United States Patent
Amburgey et al.

(10) Patent No.: US 6,837,001 B2
(45) Date of Patent: Jan. 4, 2005

(54) POSITIVE DIRECTED MOVEMENT OF TERMITES BY RADIO WAVES AS A BASIS FOR CONTROL PROCEDURES

(75) Inventors: Terry L. Amburgey, Sturgis, MS (US); Michael G. Sanders, Sturgis, MS (US); Craig D. Bell, Eupora, MS (US)

(73) Assignee: Mississippi State University, MS (US)

( * ) Notice: Subject to any disclaimer, the term of this patent is extended or adjusted under 35 U.S.C. 154(b) by 35 days.

(21) Appl. No.: 10/193,107

(22) Filed: Jul. 12, 2002

(65) Prior Publication Data

US 2003/0014907 A1 Jan. 23, 2003

Related U.S. Application Data

(60) Provisional application No. 60/304,424, filed on Jul. 12, 2001.

(51) Int. Cl.[7] .......................... A01M 1/22; A01M 19/00
(52) U.S. Cl. ...................................... 43/132.1; 367/139
(58) Field of Search ............................... 43/112, 132.1, 43/98, 124; 47/1.3; 367/139; 361/232

(56) References Cited

U.S. PATENT DOCUMENTS

| | | | | |
|---|---|---|---|---|
| 3,557,899 A | * | 1/1971 | Longinette et al. ............ | 43/124 |
| 4,223,468 A | * | 9/1980 | Lawrence ................... | 43/132.1 |
| 4,366,644 A | * | 1/1983 | Lawrence ................... | 43/132.1 |
| 4,782,623 A | * | 11/1988 | Lawrence ................... | 43/132.1 |
| 4,870,779 A | * | 10/1989 | Johnson et al. ............... | 43/124 |
| 5,196,823 A | * | 3/1993 | Formigoni ................... | 43/124 |
| 5,210,719 A | * | 5/1993 | Lawrence ................... | 43/132.1 |
| 5,339,564 A | * | 8/1994 | Wilson et al. ................. | 43/124 |
| 5,435,096 A | * | 7/1995 | Nekomoto .................... | 43/112 |
| 5,442,876 A | * | 8/1995 | Pedersen .................... | 43/132.1 |
| 5,468,938 A | * | 11/1995 | Roy ............................. | 43/112 |
| 5,473,836 A | * | 12/1995 | Liu .............................. | 43/124 |
| 5,575,105 A | * | 11/1996 | Otomo ....................... | 43/132.1 |
| 5,575,106 A | * | 11/1996 | Martin et al. .............. | 43/132.1 |
| 5,598,379 A | * | 1/1997 | Malleolo .................... | 367/139 |
| 5,896,696 A | * | 4/1999 | Stokes et al. .............. | 43/132.1 |
| 5,930,946 A | * | 8/1999 | Mah ............................ | 43/124 |
| 5,968,401 A | * | 10/1999 | Roy ........................... | 43/112 |
| 6,100,805 A | * | 8/2000 | Lake .......................... | 43/132.1 |
| 6,192,622 B1 | * | 2/2001 | Haj-Yousef ................ | 43/132.1 |
| 6,223,464 B1 | * | 5/2001 | Nekomoto et al. ........... | 43/112 |
| 6,724,312 B1 | * | 4/2004 | Barber et al. .............. | 43/132.1 |
| 2001/0033230 A1 | * | 10/2001 | Barber et al. .............. | 43/132.1 |
| 2002/0180607 A1 | * | 12/2002 | Donskoy et al. ........... | 43/132.1 |
| 2003/0146840 A1 | * | 8/2003 | Donskoy et al. ........... | 43/132.1 |
| 2003/0160699 A1 | * | 8/2003 | Trompen ..................... | 43/124 |

FOREIGN PATENT DOCUMENTS

| | | | |
|---|---|---|---|
| DE | 3915750 B1 | * | 11/1990 |
| FR | 2355441 B1 | * | 2/1978 |
| JP | 6-237677 B1 | * | 8/1994 |
| WO | WO-96/13157 B1 | * | 5/1996 |

* cited by examiner

*Primary Examiner*—Darren W. Ark
(74) *Attorney, Agent, or Firm*—Piper Rudnick LLP; Steven B. Kelber

(57) ABSTRACT

A novel method of positively directing termite activity by the use of radio waves. Also provided is a method of protecting a natural or man-made structure from termite infestation based on termite attractancy of specific radio waves.

23 Claims, 15 Drawing Sheets

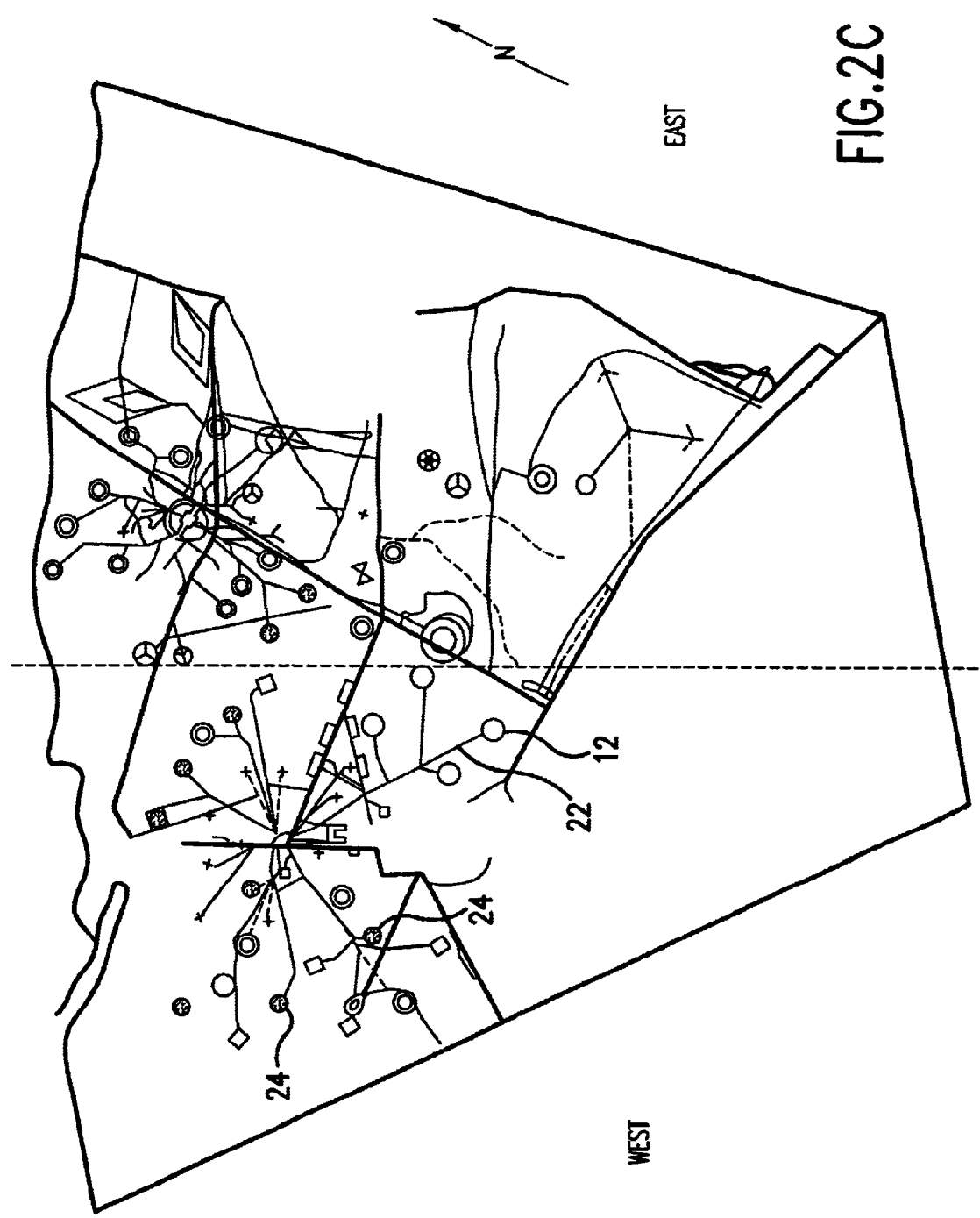

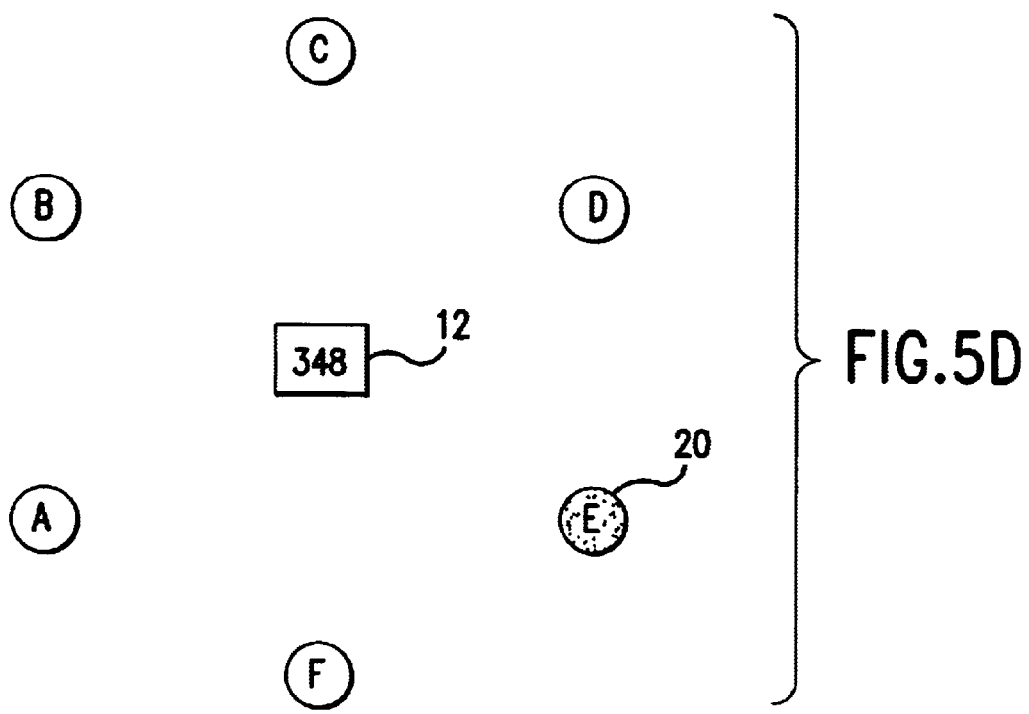
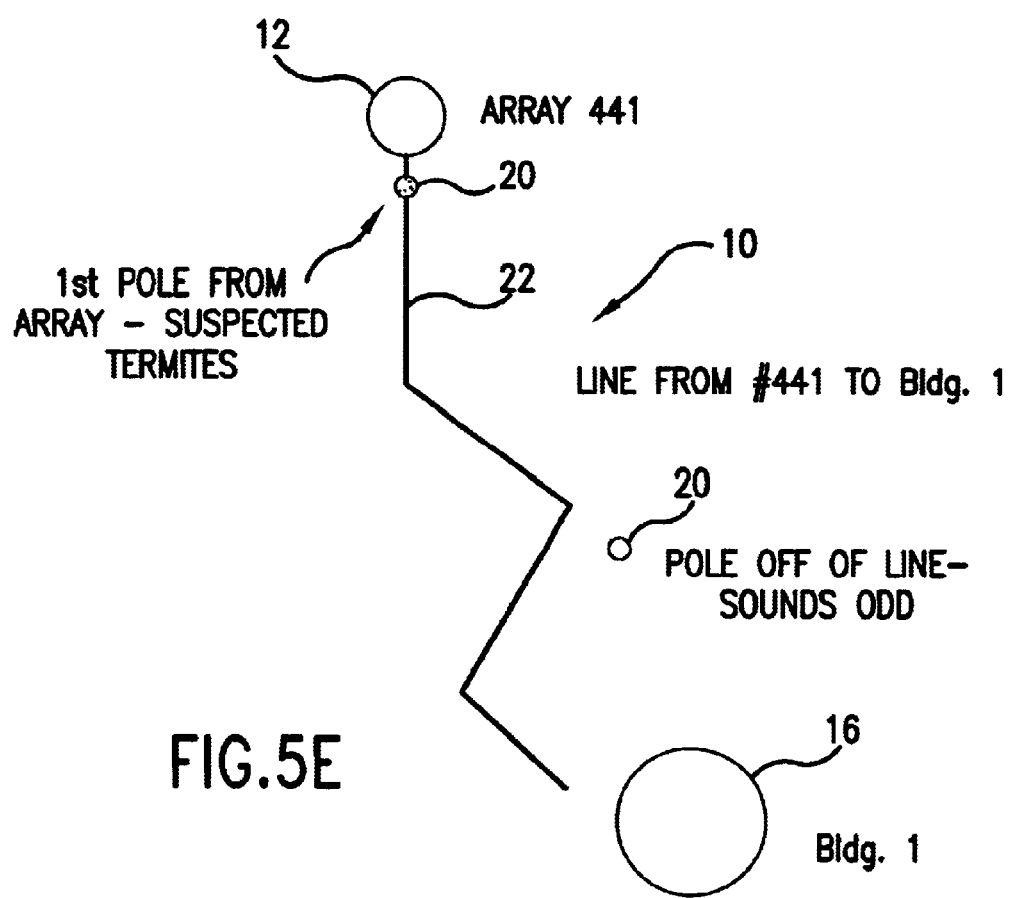

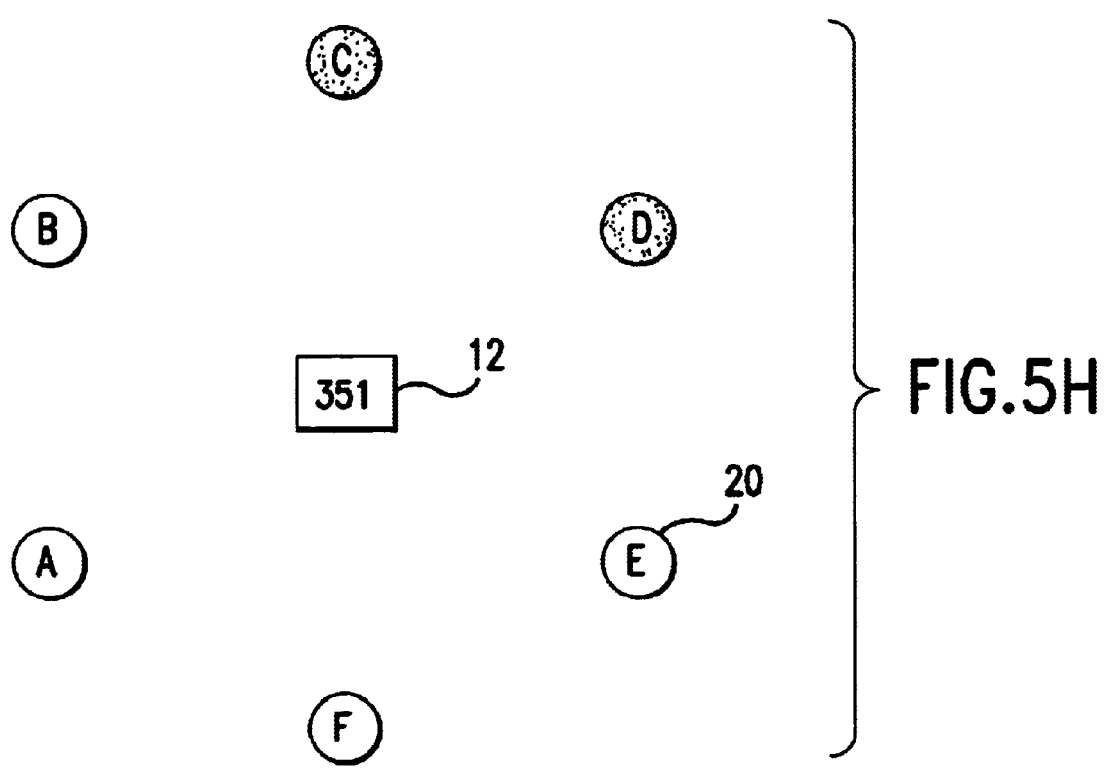

POSITIVE DIRECTED MOVEMENT OF TERMITES BY RADIO WAVES AS A BASIS FOR CONTROL PROCEDURES

This application claims priority from U.S. Provisional Application Ser. No. 60/304,424 filed Jul. 12, 2001. The entirety of that provisional application is incorporated herein by reference.

This invention was made with Government support under 19-94-111 and 19-94-112 awarded by the U.S. Department of Agriculture/Forest Service. The Government may have certain rights in this invention.

BACKGROUND OF THE INVENTION

1. Field of the Invention

This invention relates to the field of termite control technology and more specifically to a novel method of controlling termite activity by the use of radio waves. More particularly, this invention provides a method of attracting termites to a desired location by the use of radio waves within a certain frequency range.

2. Background of the Technology

Untreated termite infestation in homes leads to irreversible structural damage in buildings throughout the world. As a result, a myriad of treatments to control or destroy termite populations have been developed. Because of the potential negative environmental impact of insecticides, environmentally friendly alternatives have been the primary focus of the latest research.

A significant amount of prior art focuses on the use of electromagnetic fields to control (repel and/or negatively affect) termites. U.S. Pat. No. 5,473,836, issued to Liu discloses a method for removing insects from "hidden places" by inducing an electromagnetic field to create physical vibrations. U.S. Pat. No. 5,930,946 issued to Mah discloses a method for creating an to which pests react adversely. U.S. Pat. No. 5,442,876 issued to Pederson discloses a method for controlling termites by heating the area where termites are located to temperatures which are lethal to living organisms by means of electromagnetic energy. U.S. Pat. No. 4,870,779 issued to Bergerioux et al. discloses a method in which a low frequency, randomly varying magnetic field is generated by a device such that it interacts with the earth's geomagnetic field to eliminate (repel) rodents and similar pests located above and below ground level in the area surrounding the device.

The use of electrical energy has also been employed in efforts to eliminate (repel and/or negatively affect) termites. U.S. Pat. No. 5,210,719 issued to Lawrence discloses an apparatus and method which uses a sweep-frequency, high voltage generator coupled to an applicator gun for feeding electric power into pest-infested dielectrics, for example termite-infested wood. U.S. Pat. No. 4,366,644 issued to Lawrence discloses a method that involves the application of broad band radio frequency or multifrequency high-voltage electrical energy to termite shelter tubes, galleries and nests and to the bodies of termites in those areas. Lawrence '644 teaches that by that method termites are killed directly by electroshock or indirectly by creating interference with the digestive processes of termites. U.S. Pat. No. 4,782,623 issued to Lawrence discloses an apparatus and phase-locked high voltage, high frequency pulse generator capable of "quasiunlimited" power output and an applicator gun for feeding electric power into pest-infested dielectrics, for example termite infested wood. U.S. Pat. No. 4,223,468 issued to Lawrence discloses a method that involves killing termi application of broad band, high voltage electrical energy to habitats of termites.

The application of microwave energy has also been employed in the attempt to control (repel and/or negatively affect) termites. U.S. Pat. No. 5,575,106 issued to Martin et al. discloses a method of using low voltage "microwave horns" to kill termite populations. U.S. Pat. No. 5,896,696 issued to Stokes et al. discloses an apparatus and method for generating and radiating energy at specific wavelengths for the purpose of adversely affecting the nervous systems of "small insects."

While recent efforts to discover environmentally friendly methods of controlling termites have sought to avoid the use of conventional pesticides; they have failed to adequately protect termite-susceptible structures from infestation. Both conventional chemical and more modem methods alike seek to deal with the problem of termite infestation by killing termites in the area that is infested rather than providing a method by which termite infestation and subsequent structural damage can be prevented. The inventors have discovered a novel method by which the application of radio waves to a selected area can attract termites to that area and thereby provide protection from termites for other adjacent areas.

SUMMARY OF THE INVENTION

This invention relates to a method of controlling termite activity by emitting radio waves that attract termites to toxic baits, light traps, etc. or directing their movements away from susceptible structures.

It is therefore an object of the present invention to provide a system for transmitting radio waves of specific frequencies to an area where termite activity is desired.

It is also an object of this invention to use detection devices that monitor radio waves and/or energy levels of specific frequencies as a means to determine which structures are likely to attract termites.

It is also an object of the present invention to provide a radio wave transmitting system that is associated with proximately positioned termite bait stations, wooden stakes, wooden posts, or other termite-degradable materials to augment the termite attraction features of the radio wave transmitting system.

It is also an object of the present invention to provide a method of protecting termite-degradable materials of a natural or man-made character in a protected area by providing a radio wave transmitting system in an adjacent radio transmission area so as to attract termites to the transmission area and away from the protected area.

BRIEF DESCRIPTION OF THE FIGURES

FIGS. 2A-C provide diagrammatic representations of the test area for the transmitting system of the present invention having both active and inactive transmission areas. FIG. 2A shows the disposition of antenna arrays within the test area. FIG. 2B shows the location of termite activity within the test area that were identified in 1998. FIG. 2C shows the location of termite activity within the test area that were identified in 2002.

FIGS. 5A-H show diagrams of antenna arrays and circumferentially located wooden poles for active antenna arrays. The presence of shaded areas in the diagram indicate wooden poles having evidence of termite activity.

DETAILED DESCRIPTION OF THE INVENTION

The present invention as described below and shown in the accompanying figures is a novel method of attracting termites that is employed to provide a method of controlling termite activity by emitting radio waves of a certain frequency.

Figure 1A:
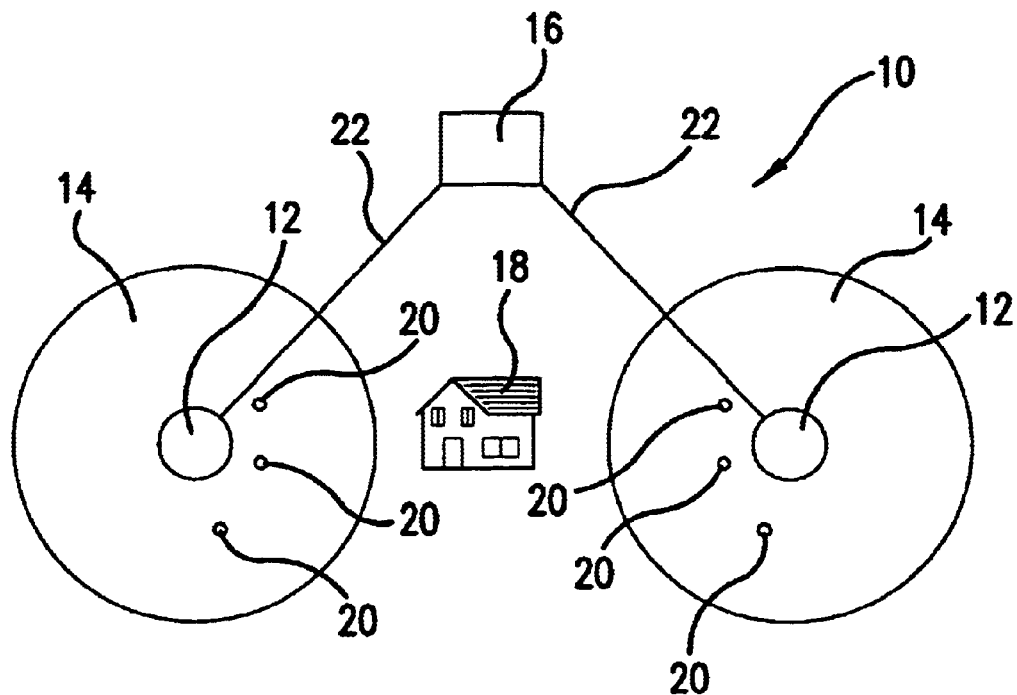
FIGS. 1A-D show diagram representations of different example embodiments of the radio wave transmitting system of the present invention.
Figure 1B:
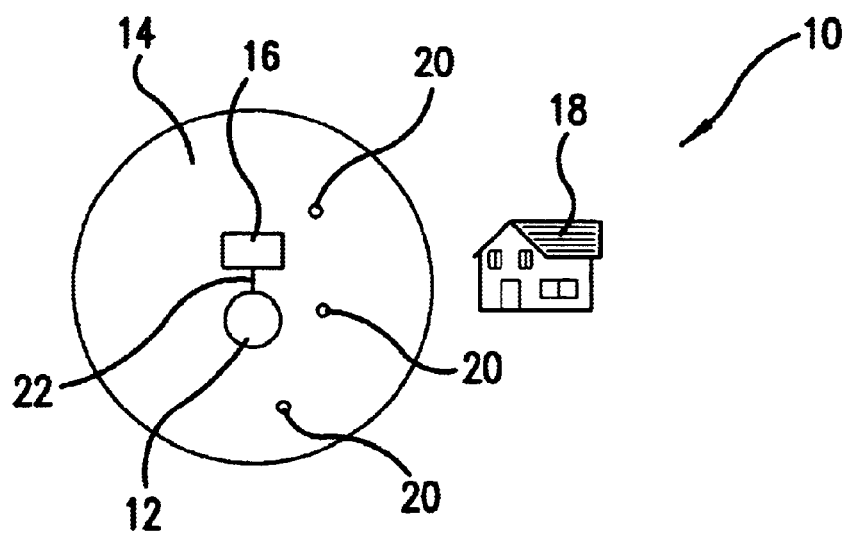
Figure 1C:
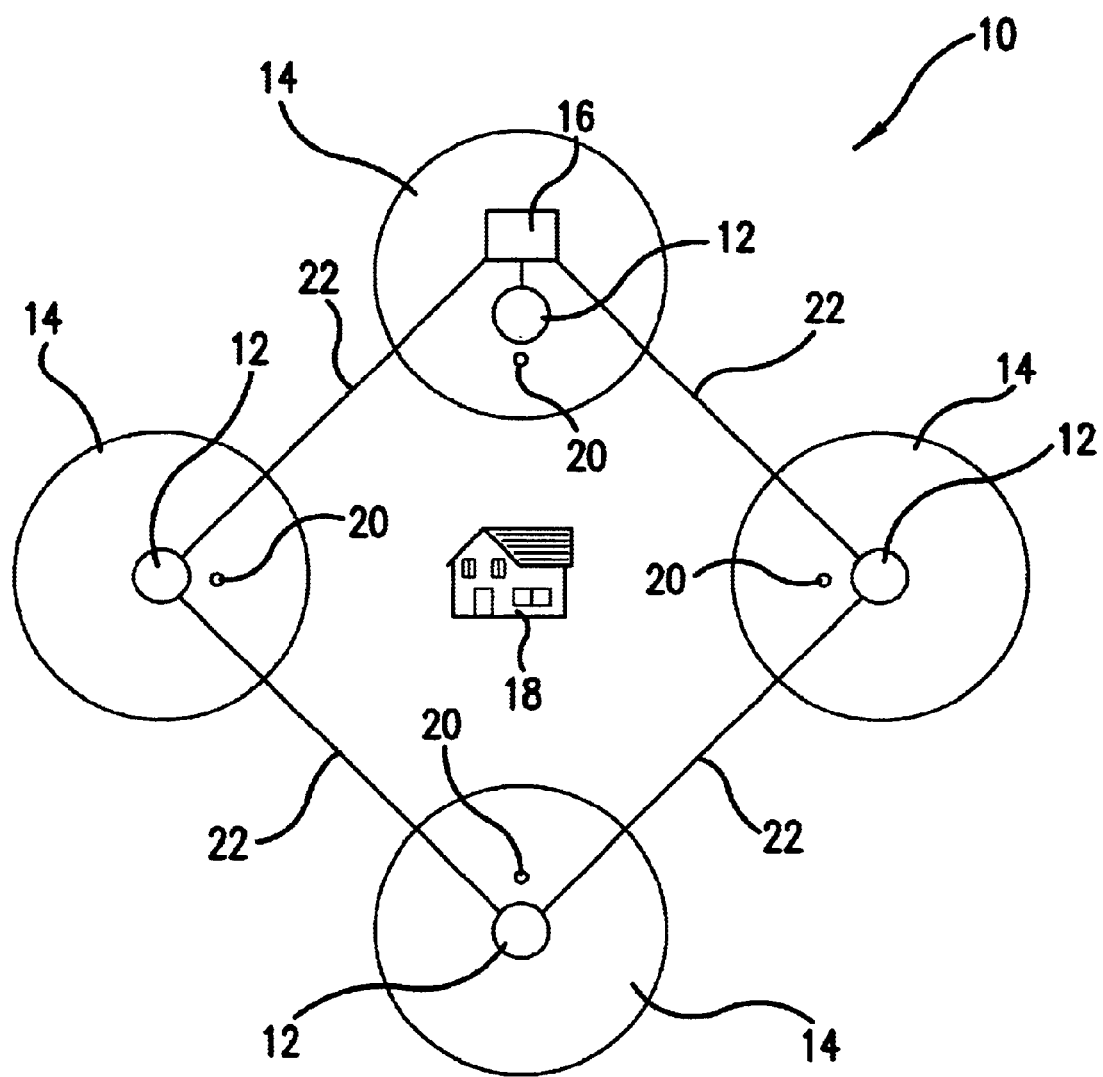
Figure 1D:
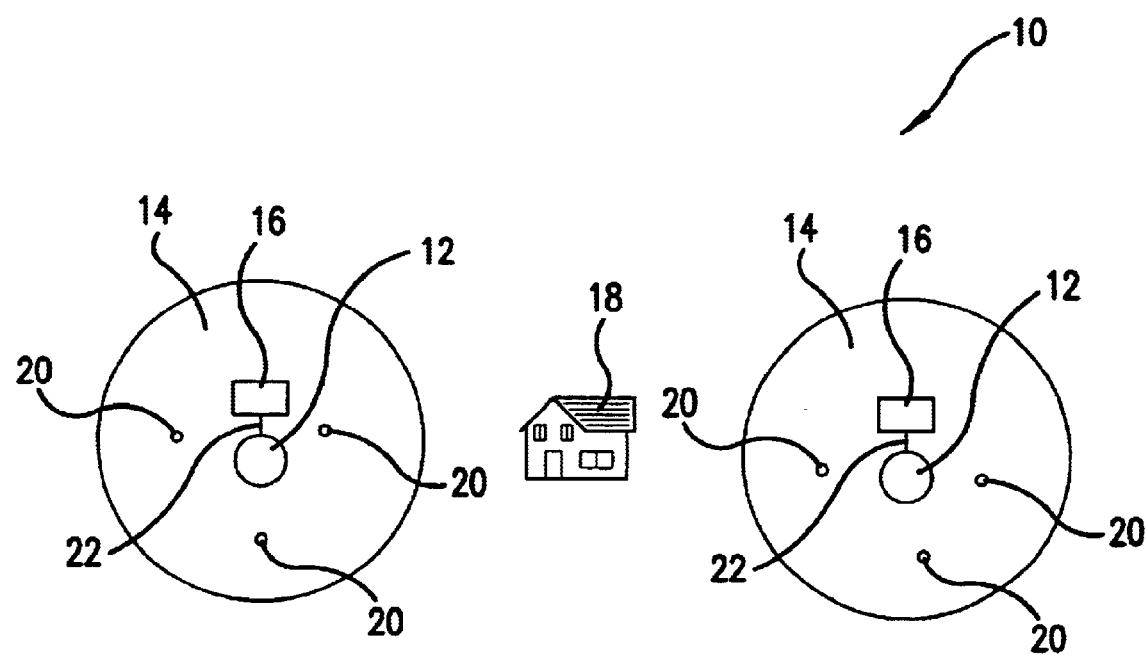

As best shown in FIGS. 1A-D the radio wave transmitting system of the present invention, generally shown at 10, can be configured to position at least one transmitting device 12 in a transmission area 14 where termite activity is desired. A radio transmitter 16 is designed to provide a broadcast radio signal of a certain wave length within a transmission area 14. As shown in FIGS. 1A and 1C the transmitter 16 can be operationally connected to more than one transmitting device 12.

As shown in FIGS. 1A-D, the radio wave transmitting system of the present invention can have varied configurations where the transmitting devices 12 can be positioned adjacent to or circumferentially disposed around a natural or man-made termite-degradable structure 18 for which protection from termite damage is desired. The structure 18 can have a degradable component and therefore be susceptible to termite damage. The different transmitting system configurations depicted in FIGS. 1A-D are non-limiting examples, the pattern of which can be widely varied without departing from the concept of the present invention.

Within the effective range of the transmission area 14 natural or man-made termite-degradable materials can be positioned so as to provide an attractant 20 for termites that is localized within the transmission area 14. Inclusion of the attractant 20, in addition to increasing the effectiveness of the termite-attraction of the transmitting device 12, also provides foci for termite infestation in the transmission area 14. By focusing the relocation of the termites to the attractant 20, subsequent containment, collection, or elimination of the termites by conventional means can be facilitated.

The transmitter 16 of the present invention can be any conventional radio wave transmitter capable of transmitting radio waves having a frequency range of about 1 to 100 megahertz and preferably 1 to 30 megahertz. The intensity of the radio wave transmission can be about After conducting tests over a 10-year period, the inventors discovered that termites are attracted to radio waves within a certain frequency range and broadcast intensity. The inventors discovered that termites such as *Coptotermes formosanus* are attracted to radio waves such as those employed in the present invention. Species such as *Coptotermes, Reticulitermes* and other termite genera can be susceptible to the attraction qualities of the present invention. Unlike conventional remedial termite control methods, the present invention provides a method to control subterranean, surface, and dispersal flight movement of termites before infestation of an area in need of protection. The inclusion of attraction augmentation in the transmitting system 10 of the present invention further permits the localization of the termites within the transmission area. The optional attractant 20 used in the transmitting system 10 can be any material to which termites can be attracted, to include, for example natural or man-made wooden items, bait stations, or any object with a termite-degradable component.

The present invention can be used to attract termites to the transmission area 14 for containment, collection and study, or elimination. By properly positioning the transmitting system 10 relative to a natural or man-made structure 18 for which termite protection is desired, the termites can be attracted away from the material or structure 18 that is to be protected and drawn towards the transmitting system 10. Non-limiting examples of transmitting system configurations which can be used to provide protection for a material or object, such as a house, fence, utility pole, or any material subject to termite infestation are shown in FIGS. 1A-D.

EXAMPLES

Field observations of the natural populations of the termite *Coptotermes formosanus* on the Lualualei Naval facility, Oahu, Hi. were conducted over a 10-year test period. These field observations indicated that movements of this subterranean termite are affected by radio waves of a frequency about 1–100 megahertz, preferably about 1–30 megahertz, and more preferably about 2–20 megahertz. The intensity of the radio transmission can be about 1–100 kilowatts; preferably about 1–10 kilowatts. Antenna arrays were formed of wires supported by large pressure-treated Douglas-fir wooden poles and were located over a large portion of the facility. The frequency of the radio waves ranged from about 1–100 megahertz at transmission intensities from about 1–100 kilowatts.

Figure 2A:
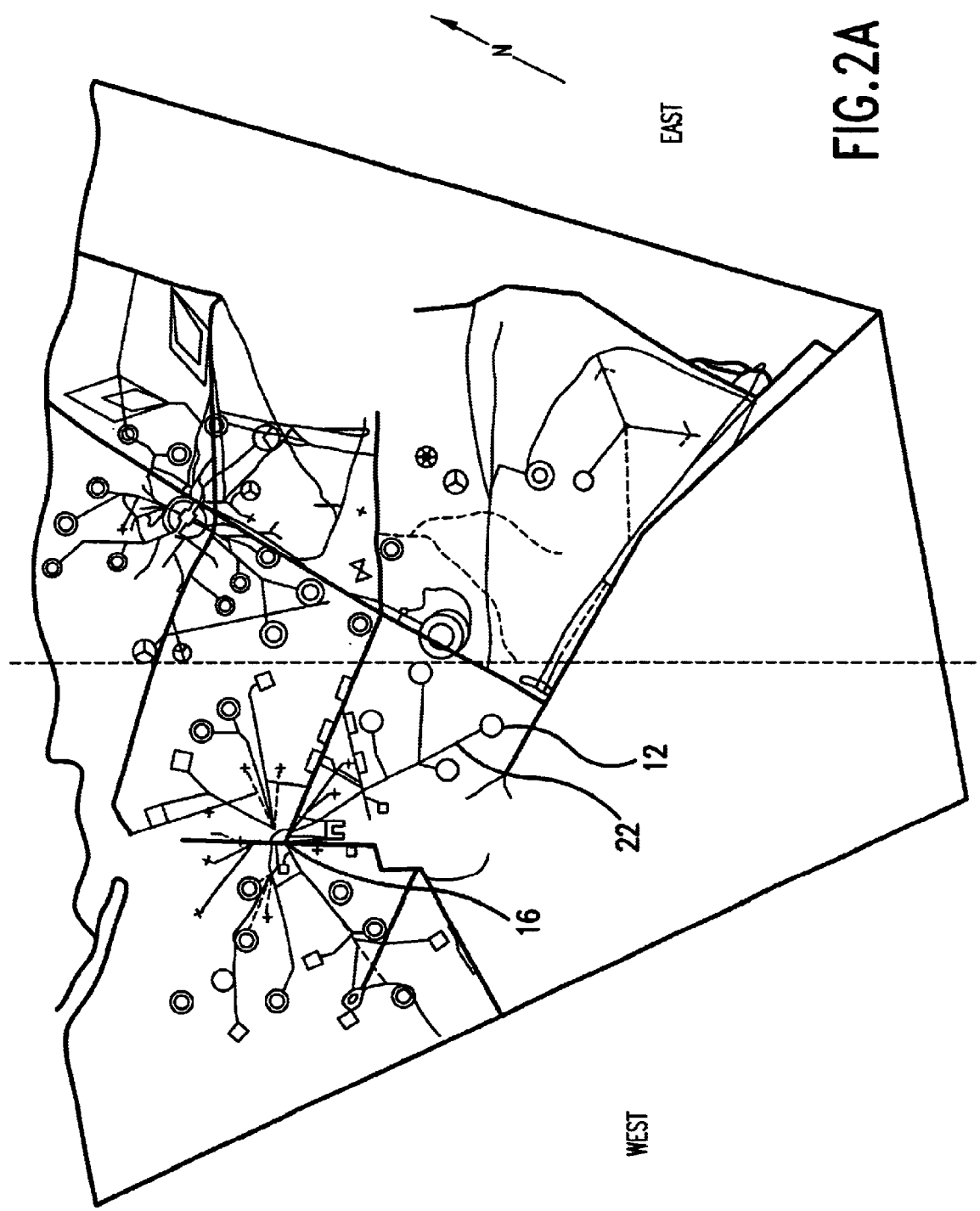
Figure 2B:
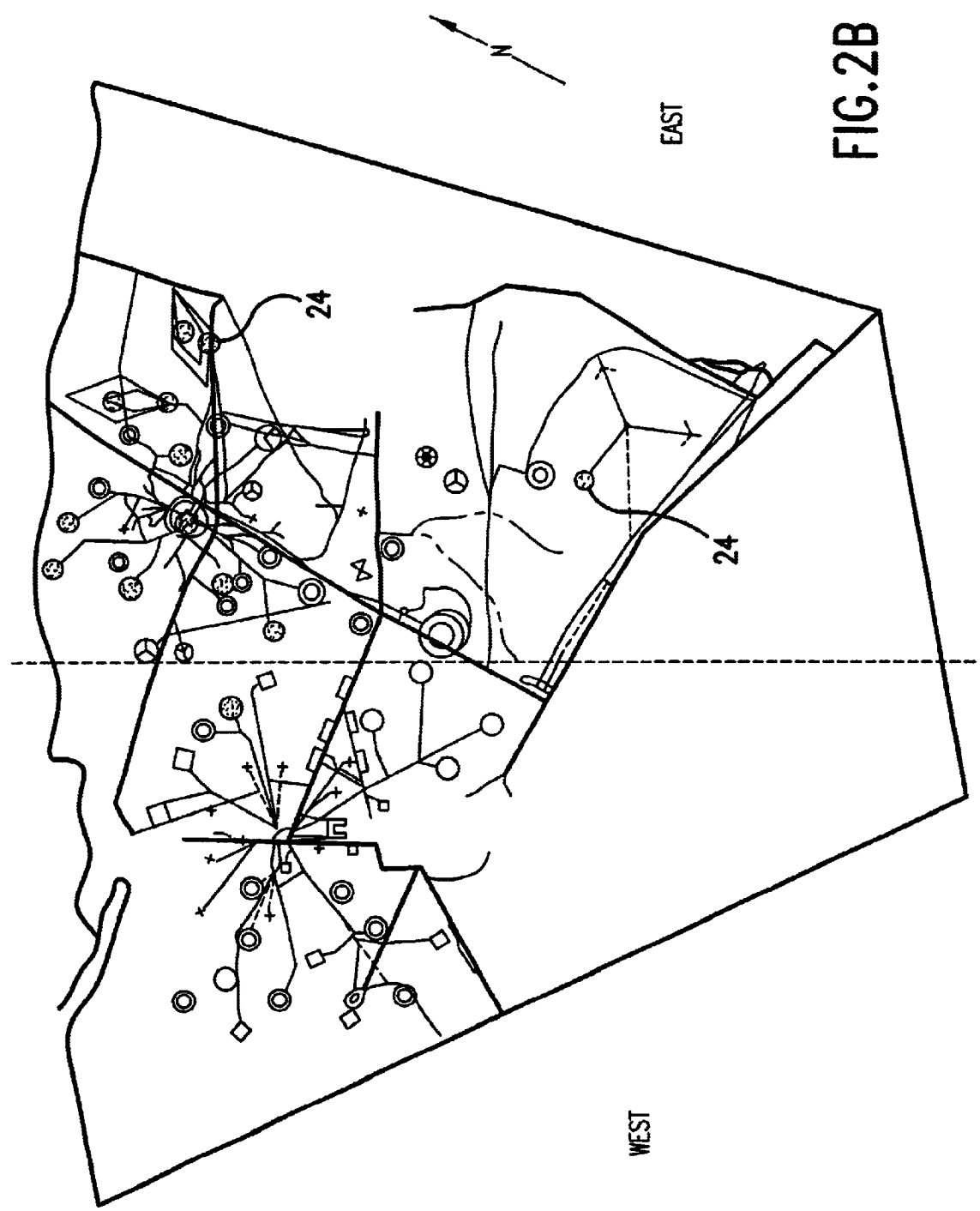

FIG. 2A is a diagrammatic representation of the disposition of antenna arrays within the test area. In FIGS. 2A-C, the diagram of the test area is divided into an eastern and a western portion by a dashed-line. The locations of numerous radio transmitters 16 connected by transmission lines 22 to circumferentially disposed antenna arrays or transmission devices 12 are shown throughout the test area. Antenna arrays 12 in the eastern portion of the test area were actively transmitting radio waves during the first six years of the 10-year test period (between 1992 and 1998). Those antenna arrays west of the dashed-line were inactive for several years prior to the test period. After the inspection for termite activity in 1998, the antenna arrays 12 in the western portion of the test area were actively transmitting for the last four years of the 10-year test period (between 1998 and 2002). Numerous areas of identified termite activity 24 shown in FIGS. 2B and 2C as shaded areas were identified by the inventors during inspections in 1998 and subsequently in 2002. As depicted in the diagrams, new termite activity was identified in those areas where antenna arrays 12 were actively transmitting while new termite activity was not found in areas with inactive antenna arrays.

Figure 3:
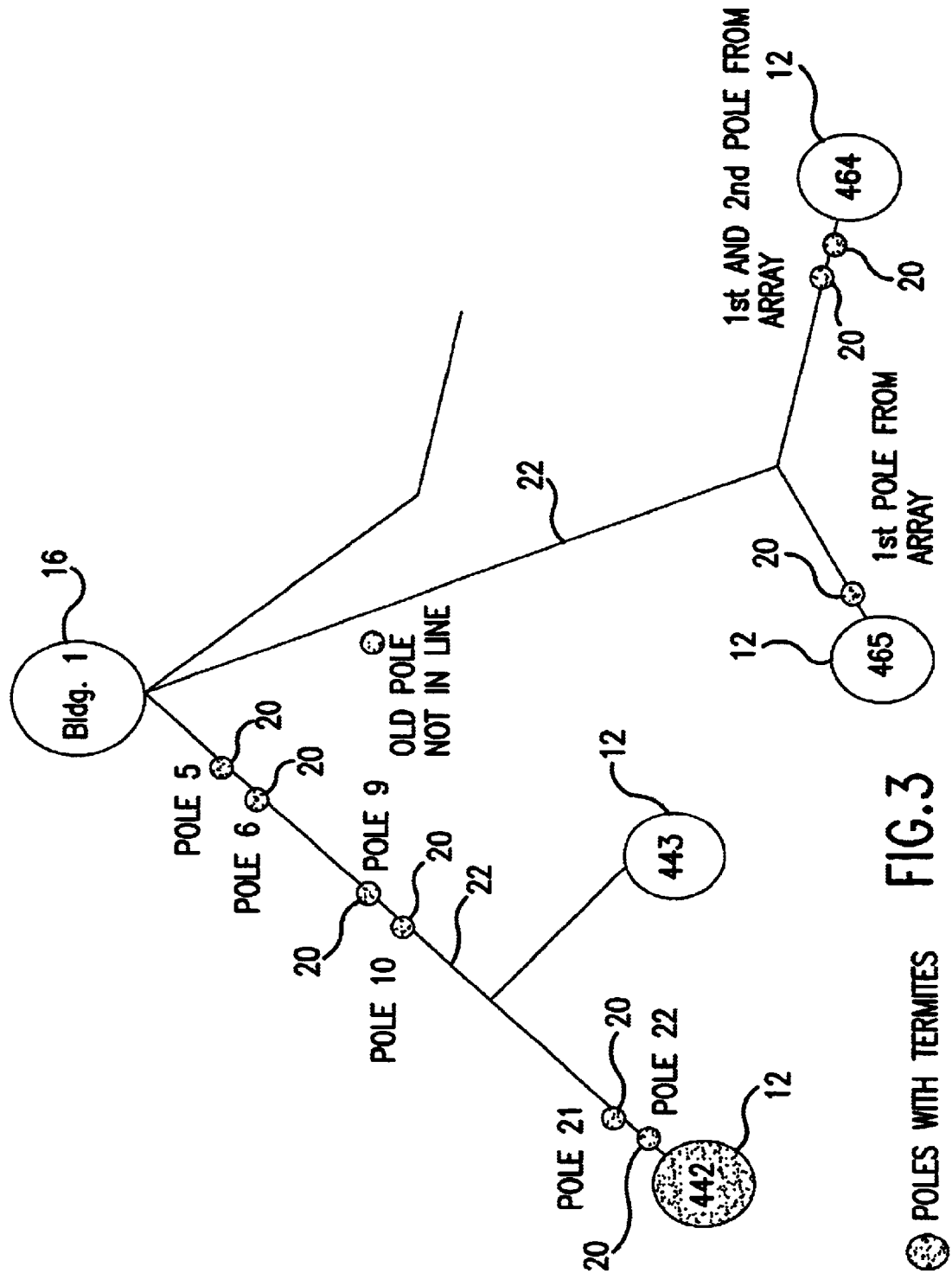
FIG. 3 shows a diagram of antenna arrays associated with a radio transmitter and the location of wooden poles, which served as termite attractants in the area of the antenna arrays. The shaded areas indicate termite activity.
Figure 4A:
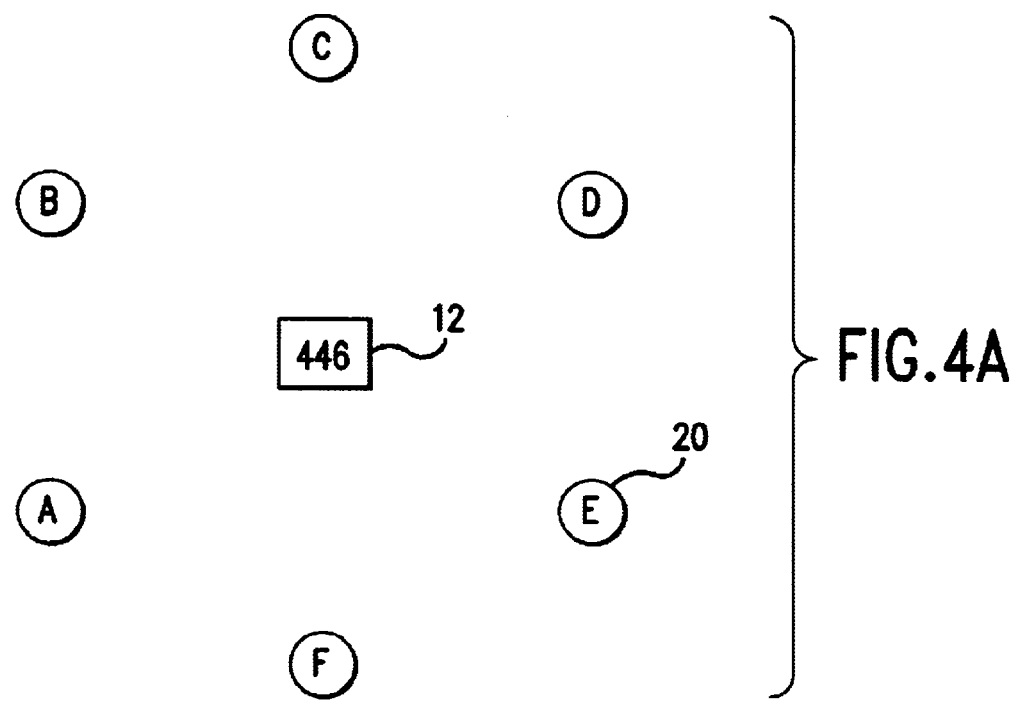
FIGS. 4A-G show diagrams of different antenna arrays and circumferentially positioned wooden poles for antenna arrays. The absence of shaded areas in the diagram indicates no new termite activity.
Figure 4B:
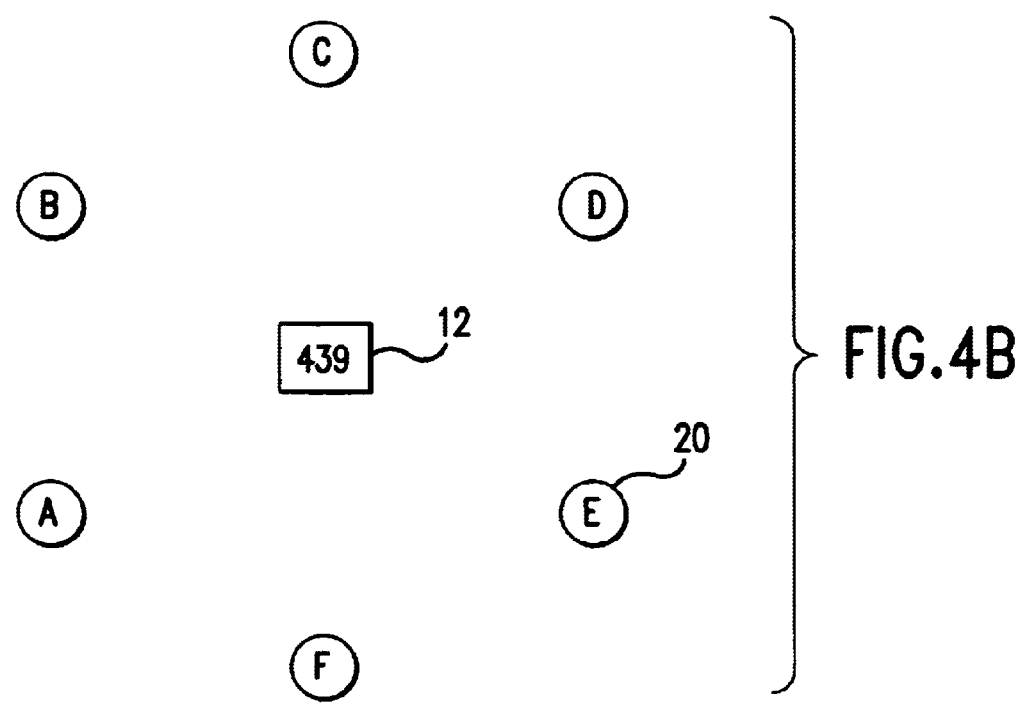
Figure 4C:
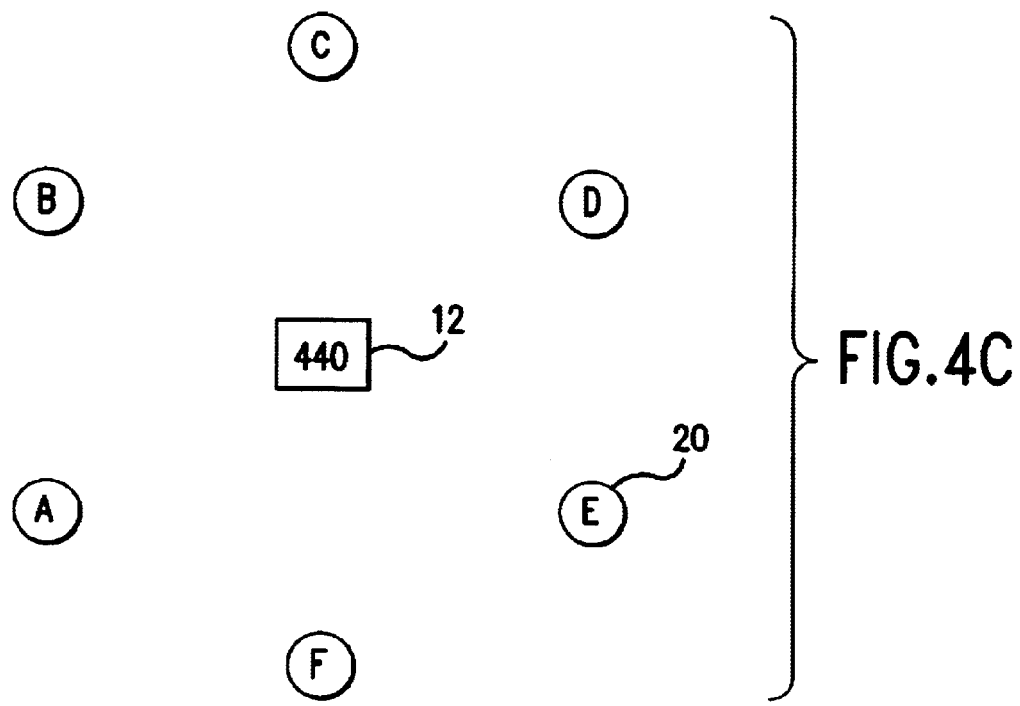
Figure 4D:
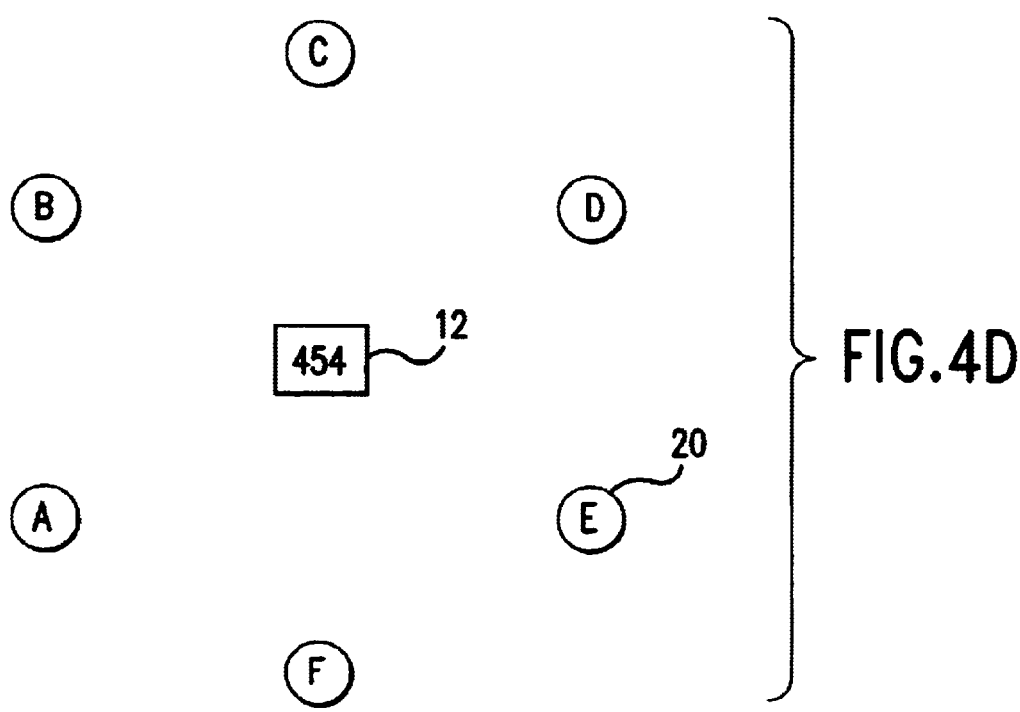
Figure 4E:
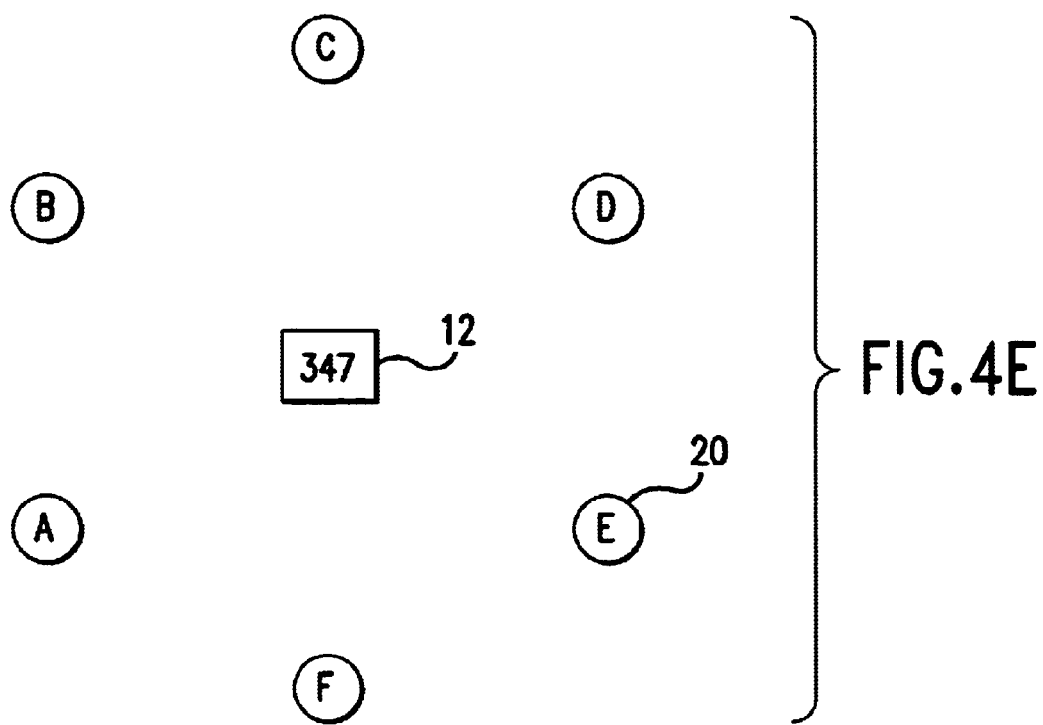
Figure 4F:
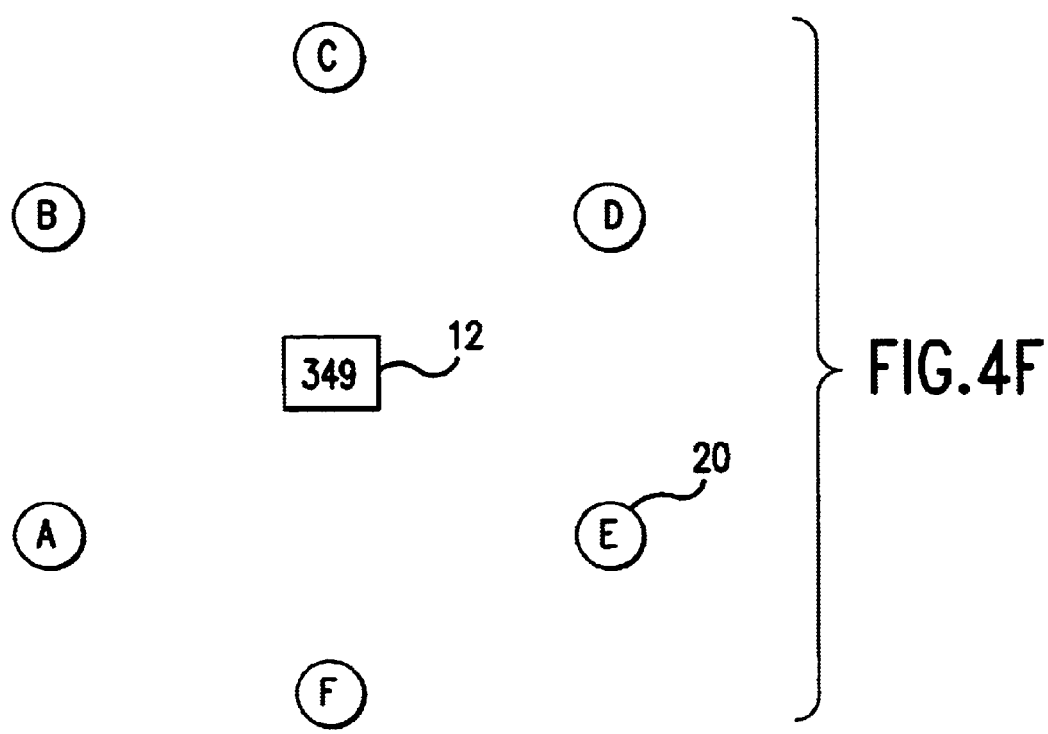
Figure 4G:
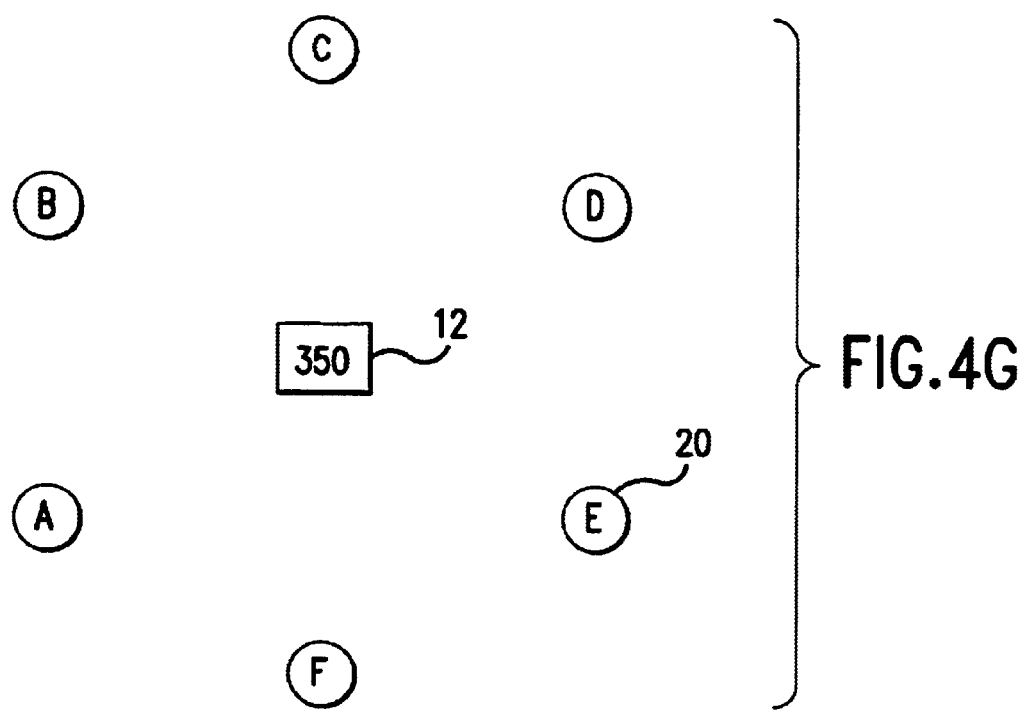
Figure 5A:
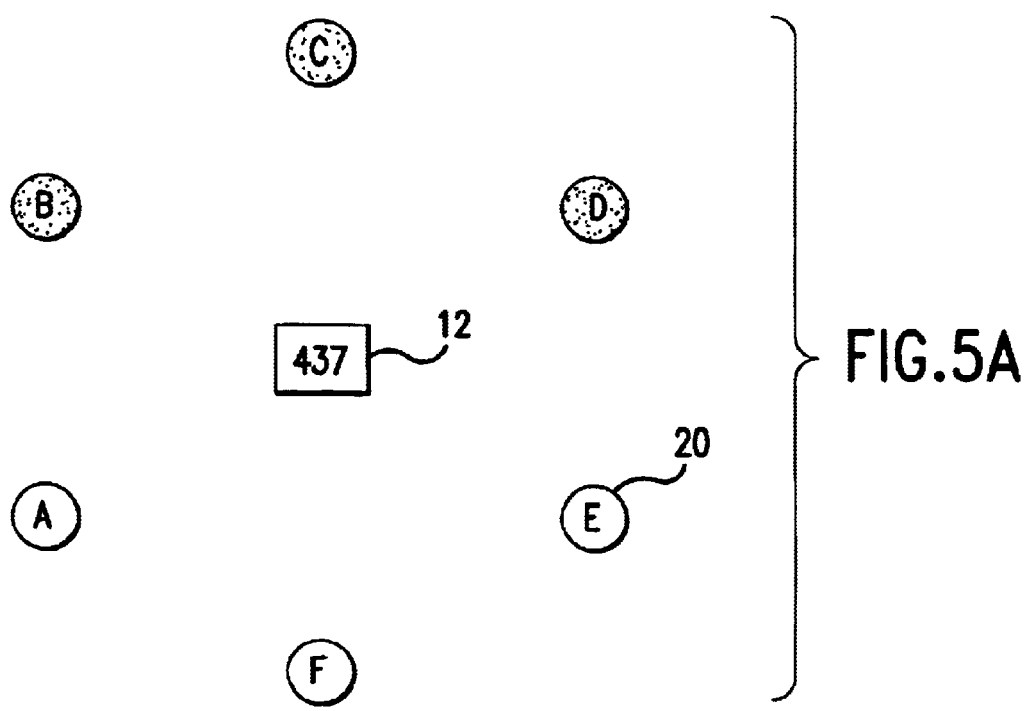
Figure 5B:
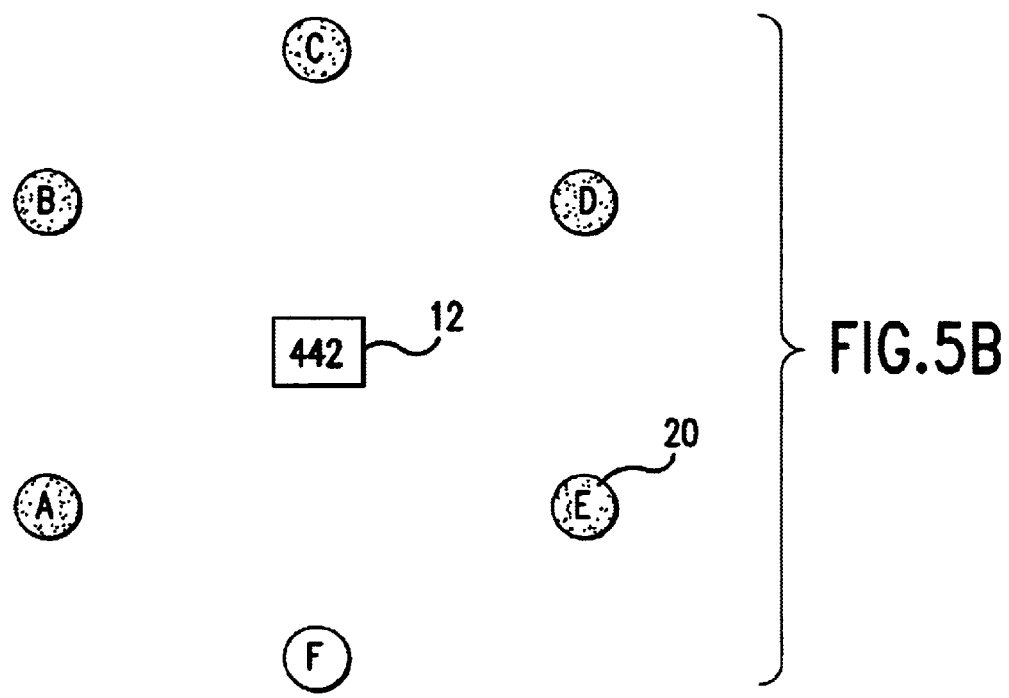
Figure 5C:
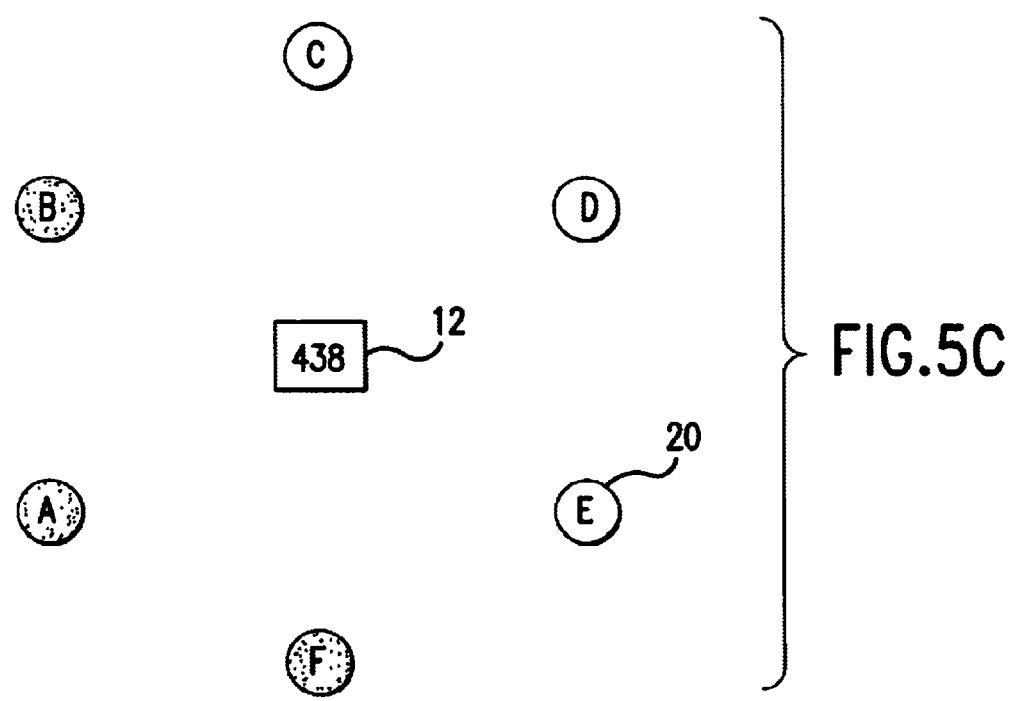
Figure 5F:
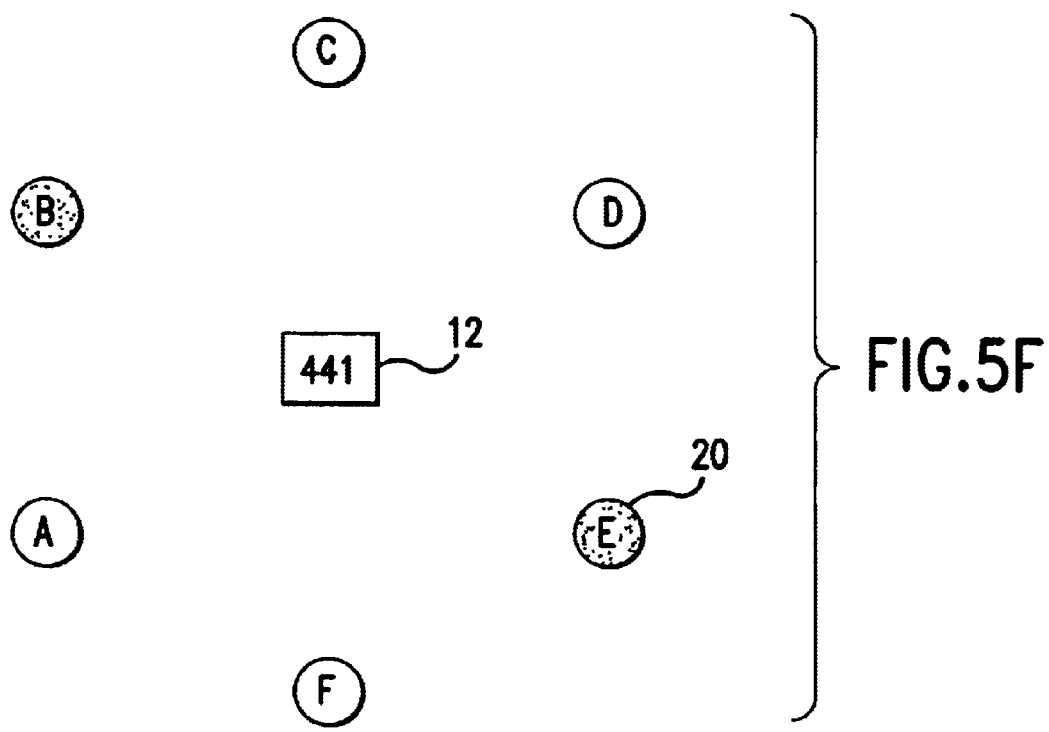
Figure 5G:
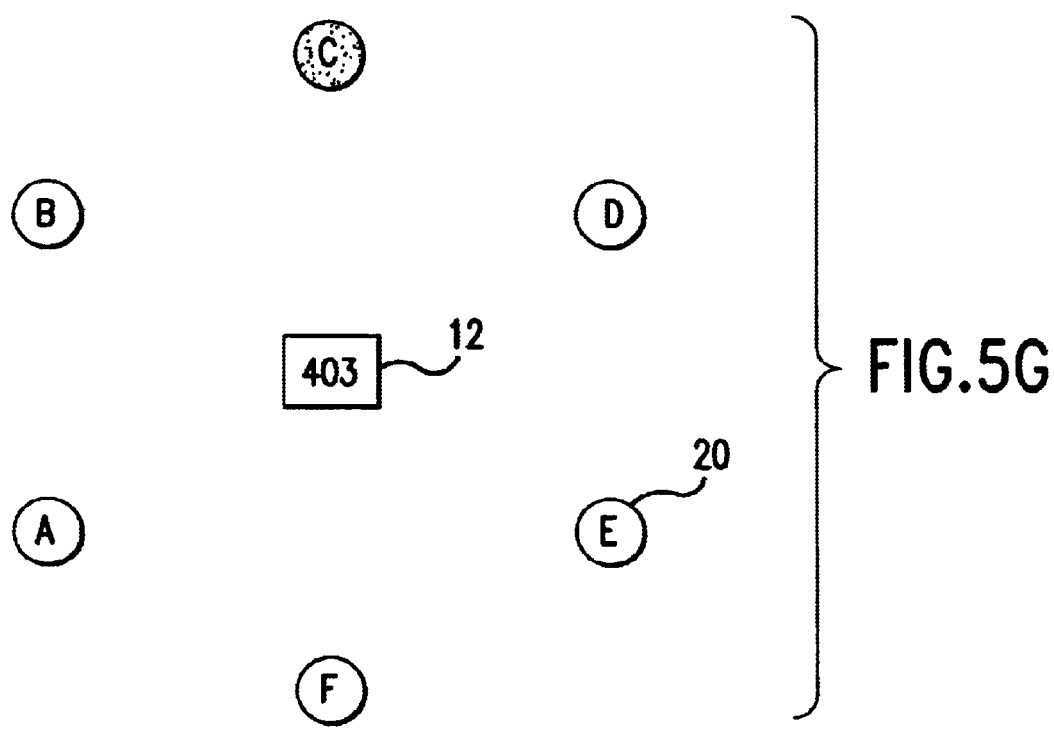

FIG. 3 shows a diagram of antenna arrays associated with a radio transmitter and the location of wooden poles, which served as termite attractants 20 in the area of the antenna arrays 12. Identified termite activity at the attractant 20 is shown as a shaded area. As shown in the diagram, the inventors identified a high level of termite infestation of wooden poles 20 placed along the transmission line 22, which operationally connects a remote radio transmitter 16 to the active antenna array 12 (antenna array number 442).

As discussed earlier, antennas arrays in the eastern portion of the test area were actively transmitting whereas antennas in the western portion of the facility remained inactive during the first six years of the test. Those active antenna arrays having the best attraction for termites broadcast a frequency of about 2–30 megahertz at an intensity of about 1 to 10 kilowatts. For those antenna arrays having the best attraction of termites, the average frequency transmitted was about 9 megahertz at an average intensity of about 4 kilowatts. The antenna arrays broadcasting in the lower frequencies and lower intensities can have an effective attraction distance in excess of 100 feet from the antenna arrays. The effective distance of the termite attraction effect of the antenna arrays is believed to vary with increased radio wave frequency and intensity. FIGS. 4A-G and FIGS. 5A-H provide an indication of the termite attraction effect of the inactive and active antenna arrays 12. Circumferentially disposed around the individual antenna arrays were wooden poles that served as an attractant 20 within the transmission area 14. These attractant poles 20 provided a foci for the termites attracted by the antenna arrays system of the present invention and permitted the inventors to measure the effect of the transmitted radio waves. In FIGS. 4A-G and FIGS. 5A-H, it can been seen that the attractant poles 20 that were disposed near active antenna arrays 12 were observed to have different amounts of termite infestation while those inactive antenna arrays 12 had reduced or no termite infestation.

The results of the years of testing the radio wave transmitting system 10 of the present invention demonstrated the ability of the system to attract termites by the use of radio wave transmission. The test also showed that by attracting termites to the transmitting system 10, adjacent wooden structures could be protected from termite infestation.

The present invention can be employed to attract termites to an active transmitting device 12 and by doing so protect an adjacent area from termite infestation. The invention can also be employed as a method to increase the efficiency of other devices used to attract insects such as the conventional light traps, termite traps, bait stations and the like.

It is also within the concept of the present invention to employ the inventor's discovery of the termite-attractant ability of a radio wave transmitting system 10 to provide an electronic sweeper that can identify structures or buildings that are more susceptible to termite infestation due to the emission of attractant radio waves.

The discovery of the inventors can also be used to provide a device that scrambles or "masks" the emission of attractant radio waves from termite susceptible structures or buildings.

The inventors have also determined that the effect of radio waves on termites can be adapted to produce a high intensity electronic field at or about 60 hertz and 20 megawatts to create a repellant shield around susceptible structures.

The invention claimed herein has been described generically, and by reference to specific embodiments. Examples and specific features are not intended to be limiting unless so indicated above. Modifications will occur to those of skill in the art without departing from the invention, except as excluded by the claims set forth below.

What is claimed is:

1. A radio wave transmitting system for the purpose of rendering an area comprising a termite-degradable structure susceptible to termite damage substantially free of termites, said transmitting system comprising:
    at least two termite attractants, a first termite attractant and at least one additional termite attractant, said at least two termite attractants being placeable at a first location, said first termite attractant comprising a radio wave transmitter operationally connected to at least one transmitting device, which said device transmits waves generated by said transmitter of a frequency and intensity that attracts termites, said device disposable with respect to a second location having said structure susceptible to termite damage so as to attract termites to said first location and away from said second location and, said device having an effective area that includes at least a portion of said first location, and said at least one additional termite attractant comprising a termite degradable material, wherein said radio wave transmitting system and said at least one additional termite attractant serve to attract termites away from said structure leaving said structure substantially free of termites.

2. The radio wave transmitting system of claim 1, wherein said radio wave frequency is about 1 to 100 megahertz.

3. The radio wave transmitting system of claim 2, wherein said radio transmitter transmits with an intensity of about 1 to 100 kilowatts.

4. The radio wave transmitting system of claim 1, wherein said radio wave frequency is about 1 to 30 megahertz.

5. The radio wave transmitting system of claim 4, wherein said radio transmitter transmits with an intensity of about 1 to 10 kilowatts.

6. The radio wave transmitting system of claim 1, wherein said frequency is about 1–30 megahertz and said intensity is about 1–100 kilowatts.

7. The radio wave transmitting system of claim 1, wherein said at least one transmitting device comprises an antenna which is mountable on or adjacent to said at least one additional termite attractant which serves as an attractant to termites.

8. A method of controlling termite activity comprising:
    providing a radio wave transmitting system for the purpose of rendering an area substantially free of termites, comprising at least two termite attractants, a first termite attractant comprising a radio wave transmitter capable of transmitting waves of a frequency and intensity to attract termites and at least one additional termite attractant comprising a termite-degradable material;
    positioning said radio wave transmitter and said at least one additional termite attractant within a first location, said first location being inhabitable by termites; and
    emitting radio wave transmissions generated by said transmitter of said frequency and intensity that attracts termites from said transmitter, wherein said termites are attracted by said radio wave transmissions toward said first location and away from a second location.

9. The method of claim 8, wherein said first location is an area where termite activity is desired.

10. The method of claim 9, wherein said material is selected from the group consisting of a natural wooden object, a man-made wooden object, a termite-degradable object, a termite bait material, and a structure that includes a wooden component.

11. The method of claim 9, wherein said second location is within a radius of about 100 feet from said transmitter.

12. The method of claim 8, wherein said radio waves are transmitted at a frequency of about 1 to about 100 megahertz.

13. The method of claim 12, wherein said radio waves are transmitted at an intensity of 1 to 100 kilowatts.

14. The method of claim 12, wherein said radio waves are transmitted at an intensity of 1 to 30 kilowatts.

15. The method of claim 8, wherein said radio waves are transmitted at a frequency of about 1 to about 30 megahertz.

16. A method of protecting a slected area from termite activity comprising:
  providing a radio wave transmitting system for the purpose of rendering the selected area substantially free of termites, comprising at least two termite atiractants, a first termite attractant comprising a radio wave transmitter capable of transmitting waves of a frequency and intensity to attract termites and at least one additional termite attractant comprising a termite-degradable material;
  positioning said radio wave transmitter and said at least one additional termite attractant within a first location, said first location being inhabitable by termites and adjacent to a second location comprising said selected area which is vulnerable to termite activity; and
  emitting radio wave transmissions generated by said transmitter of said frequency and intensity that attracts termites from said transmitter, wherein said termites are attracted toward said first location and away from said second location, thereby protecting said selected area from termite activity.

17. The method of claim 16, wherein said selected area is located at least about 100 feet from said transmitter.

18. The method of claim 17, wherein said second location is within a radius of about 100 feet from said transmitter.

19. The method of claim 16, wherein said material is selected from the group consisting of a natural wooden object, a man-made wooden object, a termite-degradable object, a termite bait material, and a structure that includes a wooden component.

20. The method of claim 16, wherein said radio waves are transmitted at a frequency of about 1 to about 100 megahertz.

21. The method of claim 20, wherein said radio waves are transmitted at an intensity of 1 to 100 kilowatts.

22. The method of claim 16, wherein said radio waves are transmitted at a frequency of about 1 to about 30 megahertz.

23. The method of claim 22, wherein said radio waves are transmitted at an intensity of 1 to 30 kilowatts.

* * * * *